United States Patent [19]
Sundberg

[11] Patent Number: 5,606,768
[45] Date of Patent: Mar. 4, 1997

[54] EMISSIONS COLLECTION AND VENTING SYSTEM FOR VAN-MOUNTED CLEANING APPARATUS

[75] Inventor: Lorne Sundberg, Saskatoon, Canada

[73] Assignee: Esteam Manufacturing Ltd., Calgary, Canada

[21] Appl. No.: 516,951

[22] Filed: Aug. 18, 1995

[30] Foreign Application Priority Data

Jun. 19, 1995 [CA] Canada .................................. 2152127

[51] Int. Cl.$^6$ ............................ A47L 11/34; G05D 23/00
[52] U.S. Cl. .................. 15/313; 15/321; 15/326; 15/409
[58] Field of Search .................... 15/321, 313, 409, 15/326, 340.1

[56] References Cited

U.S. PATENT DOCUMENTS

| | | |
|---|---|---|
| 1,499,937 | 7/1924 | Leathers ............................ 15/313 X |
| 1,611,437 | 12/1926 | Hardesty ........................... 15/313 X |
| 2,667,031 | 1/1954 | Ryder . |
| 3,712,065 | 1/1973 | Hurst . |
| 4,158,248 | 6/1979 | Palmer . |
| 4,313,523 | 2/1982 | Copen . |
| 4,418,532 | 12/1983 | Momose et al. . |
| 4,862,511 | 9/1989 | Martinez et al. .................. 15/340.1 X |
| 4,940,082 | 7/1990 | Roden . |
| 4,949,424 | 8/1990 | Shero . |
| 5,371,918 | 12/1994 | Shero ..................................... 15/321 |
| 5,454,139 | 10/1995 | Beck ................................... 15/313 X |
| 5,469,598 | 11/1995 | Sales ..................................... 15/321 |

FOREIGN PATENT DOCUMENTS

| | | |
|---|---|---|
| 1302995 | 12/1988 | Canada . |
| 2085510 | 12/1992 | Canada . |

*Primary Examiner*—Chris K. Moore
*Attorney, Agent, or Firm*—Biebel & French

[57] ABSTRACT

A van-mounted or mountable cleaning system as disclosed includes a water heater having a burner therein to heat the water and a flue outlet to release combustion gases therefrom. A motor driven vacuum blower has an air input port and an output port for blower exhaust, both the water heater and the vacuum blower being mounted or mountable in an interior portion of the van body. A flue gas duct is connected to said flue outlet and extends downwardly toward lower extremities of the van body and then, in use, leads outwardly of the van body. An exhaust conduit enters into said flue gas duct in such manner as to create a Venturi effect therewith tending to draw combustion gases away from said burner along said downwardly extending flue gas duct and thence outwardly of a lower portion of the van body in which the system is installed.

11 Claims, 5 Drawing Sheets

EMISSIONS COLLECTION AND VENTING SYSTEM FOR VAN-MOUNTED CLEANING APPARATUS

BACKGROUND OF THE INVENTION

This invention relates generally to van-mounted cleaning systems and, in particular to a emissions collection and venting system for van-mounted cleaning apparatus and the like.

A wide variety of equipment and services are available to-day for in-situ cleaning of carpets and upholstery. This equipment includes apparatus for the heating of cleaning liquid which is conveyed under pressure to and sprayed onto the surface to be cleaned. Means are provided for effecting vacuum removal of the liquid from the carpet or upholstery along with the soil. This equipment, which usually includes an internal combustion engine for driving the cleaning liquid and vacuum pumps, is usually mounted in a panel truck or van for ease of transport.

One such system which has achieved considerable success is sold under the trademark "CLEANCO" and is available from Esteam Manufacturing Ltd., Calgary, Alberta, Canada. This system provides a van-mounted package of equipment which includes a high pressure pump which draws water from a fresh water supply, passes it through a heat exchanger to heat the same and then passes it through a high pressure hose to a hand-held cleaning wand which applies the high pressure water to the surface to be cleaned. A vacuum blower capable of generating a strong vacuum is connected to a recovery tank from which air is extracted to produce the vacuum. A vacuum hose is connected to this tank and to the cleaning wand. This system sucks the water along with the soil from the carpet etc. and passes same into the waste recovery tank.

The above-noted heat exchanger is capable of providing the required water temperatures for carpet cleaning, e.g. in the order of 240° F. Temperature adjustment controls are of course provided. Suitable hoses and accessories are provided along with hose reels. A waste water pumping unit which enables on site waste disposal-by automatically pumping waste water into an authorized receptacle while work is being done may also be provided.

While many of the liquid cleaning systems in use today utilize heat from an internal combustion engine to provide at least a portion of the heat required for the cleaning liquid, the present invention is particularly concerned with cleaning systems wherein the heat exchangers are fired by way of a fuel-fired burner.

One disadvantage associated with fuel-fired heat exchangers is that the fuel burner must be vented outside of the vehicle that it is installed in. In the past, the means utilized for venting this type of heater required one to cut a hole in the top or side of the van above the exhaust port of the water heater. The vent pipes were then routed to and through the exit hole thus providing a system having a very cumbersome and unattractive appearance.

SUMMARY OF THE INVENTION

It is the basic object of the present invention to overcome the disadvantage noted above and to provide a means for venting the heat exchanger burner unit in such a way that holes and vent pipes in the top and/or sides of the van are eliminated.

It is a further object of the invention to provide a cleaning system of the type mentioned above wherein provision is made for the flow of exhaust gases to enter into a flue gas duct from the heat exchanger burner thereby to create a Venturi effect which tends to draw combustion gases away from the burner and downwardly thereof and outwardly of a lower portion of the van body.

A van-mounted or mountable cleaning system in accordance with the invention includes a water heater having a burner therein to heat the water and a flue outlet to release combustion gases therefrom. A motor driven vacuum blower has an air input port and an output port for blower exhaust, both the water heater and the vacuum blower being mounted or mountable in an interior portion of the van body. A flue gas duct is connected to said flue outlet and extends downwardly toward lower extremities of the van body and then, in use, leads outwardly of the van body. An exhaust conduit enters into said flue gas duct in such manner as to create a Venturi effect therewith tending to draw combustion gases away from said burner along said downwardly extending flue gas duct and thence outwardly of a lower portion of the van body in which the system is installed.

Furthermore in accordance with the invention in another aspect said flue gas duct includes an outlet portion extending through a floor portion of the van body.

In a preferred form of the invention said exhaust conduit enters into said flue gas duct at a point adjacent said outlet portion to define a Venturi therewith.

The vacuum blower is preferably driven by an internal combustion engine having an exhaust outlet communicating with the exhaust from said blower such that the combined engine exhaust and blower exhaust air are fed into said exhaust conduit.

A preferred form of the invention includes an exhaust silencer arranged such that said engine exhaust and said blower exhaust air pass into said exhaust silencer before moving through said exhaust conduit and into said flue gas duct.

Further features and advantages of the invention will become readily apparent to those skilled in this art from a review of the following description of a preferred embodiment of same taken in conjunction with the appended drawings and claims.

BRIEF DESCRIPTION OF THE VIEWS OF DRAWINGS

DETAILED DESCRIPTION OF A PREFERRED EMBODIMENT

Figure 1:
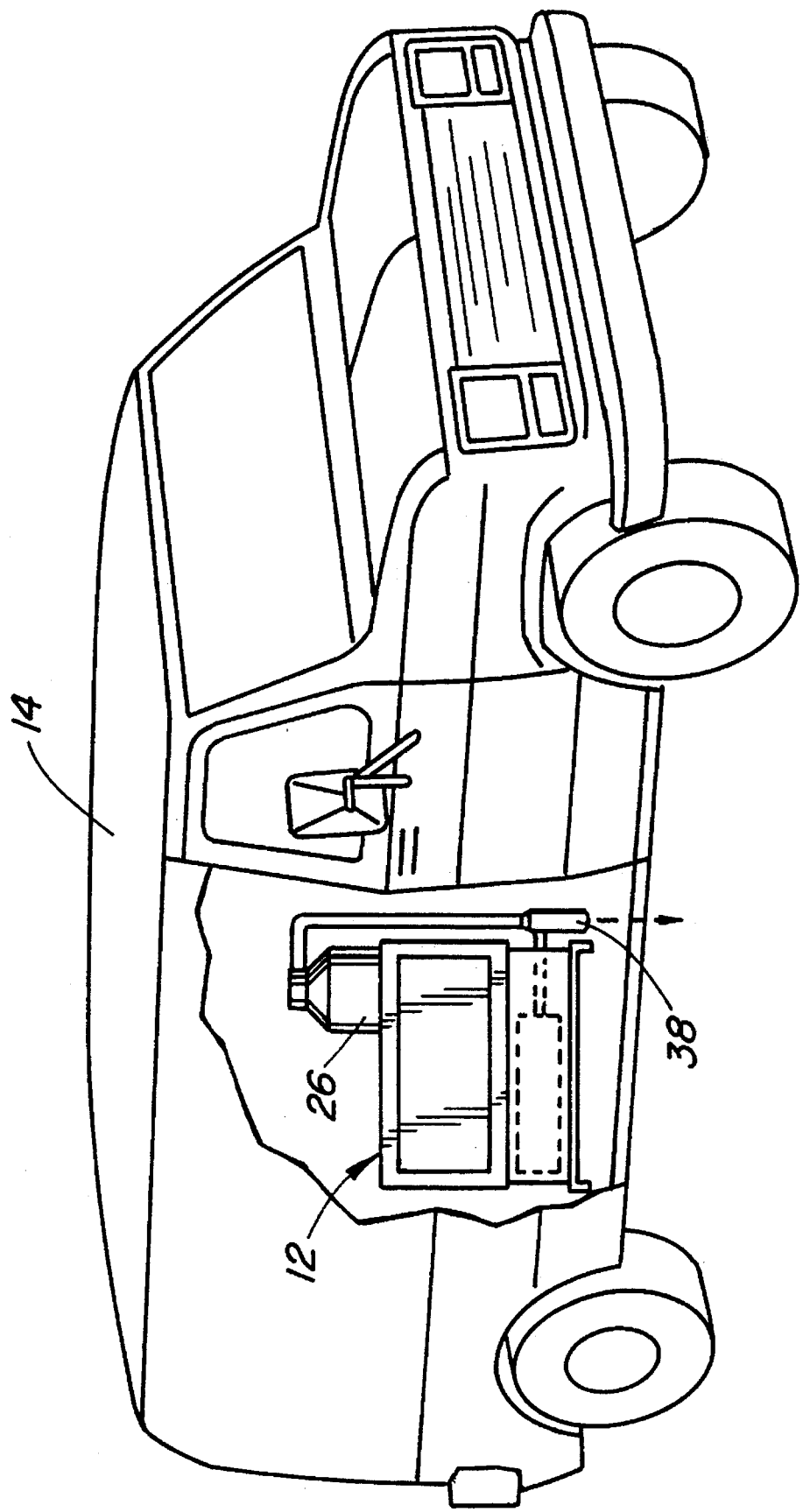
FIG. 1 is a perspective view, partially cut away, so as to show a van-mounted cleaning system in accordance with an embodiment of the invention.
Figure 2:
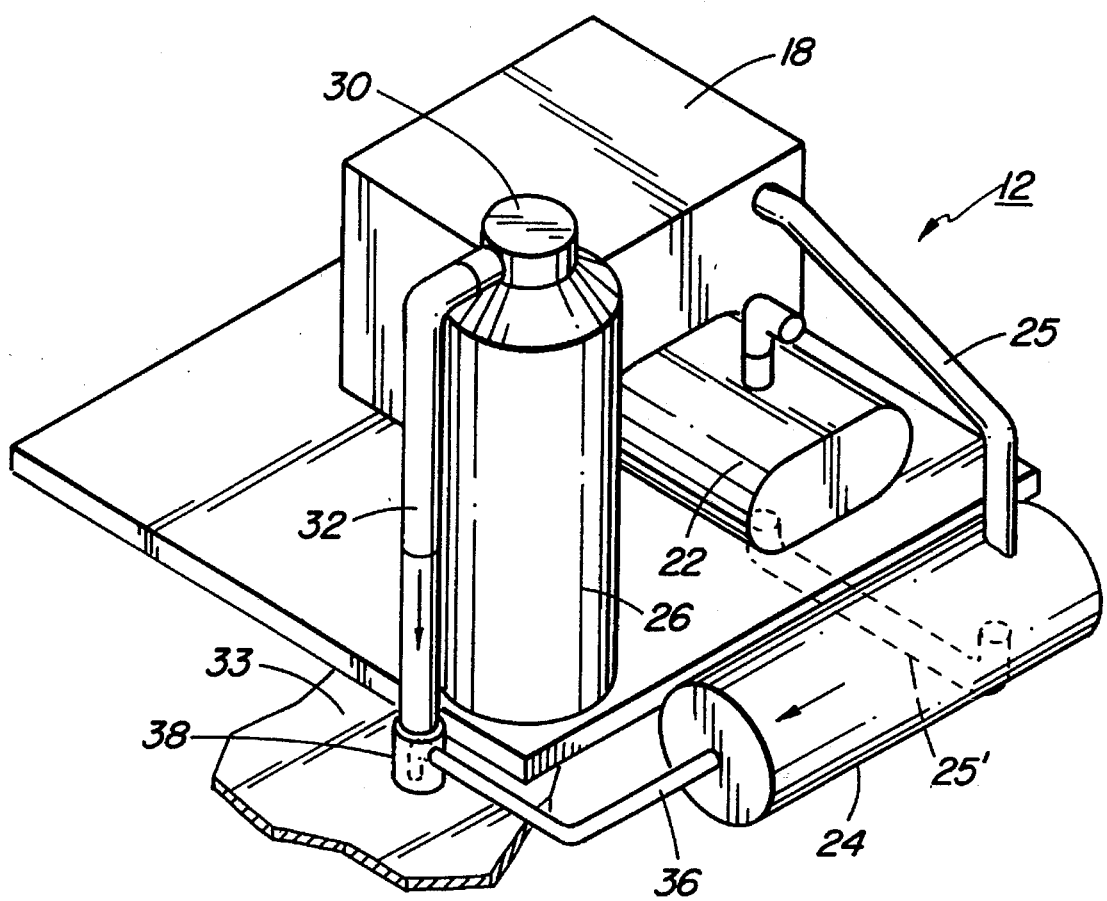
FIG. 2 is a somewhat diagrammatic perspective view of major components of a carpet cleaning system utilizing principles of the present invention.
Figure 3:
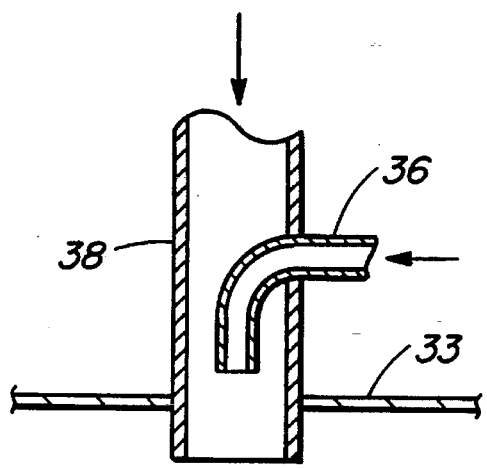
FIG. 3 is a section view of the Venturi portion of the system illustrated in FIG. 2.
Figure 4:
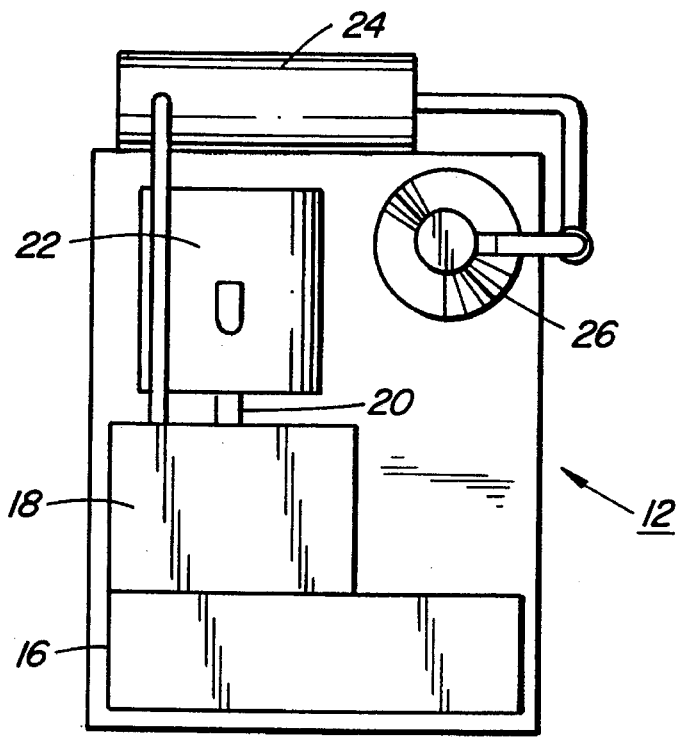
FIG. 4 is a diagrammatic top plan view illustrating the major components of the system shown in FIG. 2.
Figure 5:
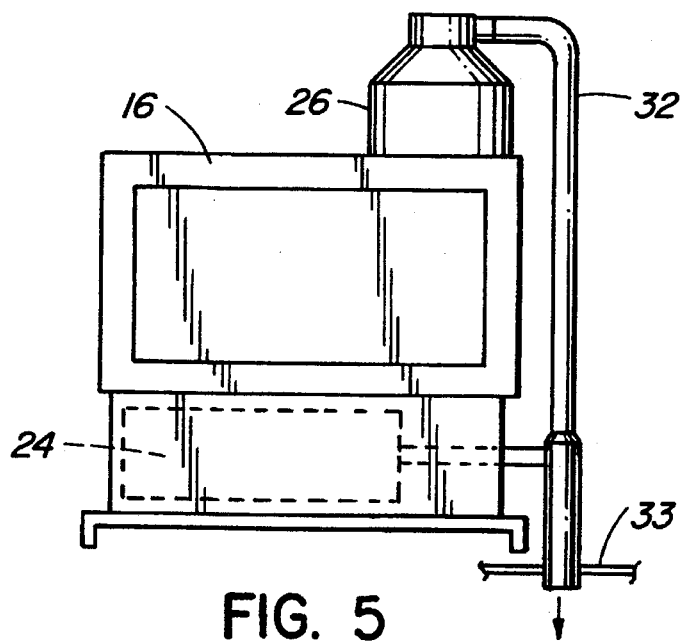
FIG. 5 is a diagrammatic front elevation view thereof.

Referring now to the drawings there is shown in FIG. 1 a carpet cleaning system 12 incorporating the principles of the present invention mounted in a standard cargo van 14 of any well known make and model.

With reference to FIGS. 2–5, the major components of the cleaning system which are illustrated include a control panel 16 (shown in FIGS. 4 and 5 only) which need not be further described since various forms of control panels and systems are extremely well known in the art. A drive engine 18 is provided and this may for example be a "Briggs & Stratton", 18 HP V-Twin Vanguard or equivalent engine from other engine manufacturers. The output of this engine is connected by way of a coupling system 20 which may be a "Revco" R-Flex rubber coupling type 7JE or equivalent coupler from other manufacturers.

The coupling system 20 in turn is connected to a vacuum blower 22 having air inlet port 22', which blower may for example be a Roots Dresser - Universal RAI rotary lobe blower Model #36 which typically runs at 3600 RPM with a flow through of 330 CFM. An equivalent blower from other blower manufacturers may of course be used.

The exhaust outputs from both the engine 18 and the vacuum blower 22 pass into a silencer or muffler system 24 via suitable conduits 25, 25'. This silencer 24 may, for example, be a "Stoddard"- rotary blower discharge silencer Model D13H-2.5 (special absorption), or alternatively an equivalent silencer from other silencer manufacturers.

The system also includes a heat exchanger in the form of a water heater 26 which, in itself, may be of conventional construction provided that it is capable of supplying water at a temperature of about 240° F. at the desired flow rate and pressure. This water heater is typically fired by a fuel oil burner as for example a "Wayne" fuel oil burner made by Scott Fetzer Company, Model MSR-DC. Equivalent burners from other burner manufacturers may of course be utilized.

Other standard components of the cleaning system such as the high pressure pump, the cleaning wand, hoses, water tanks and control systems are not shown as they are all conventional and do not form part of the invention.

Figure 9:
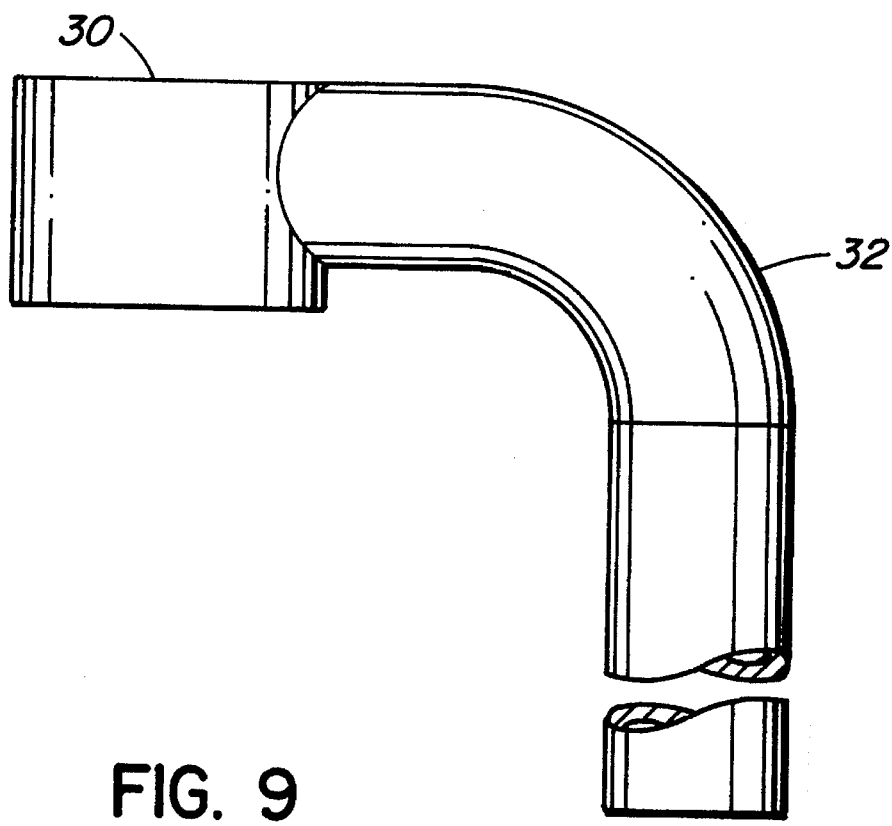
FIGS. 9 and 10 are side and top plan views respectively of the flue outlet cap and duct at the top of the burner fired water heater.
Figure 10:
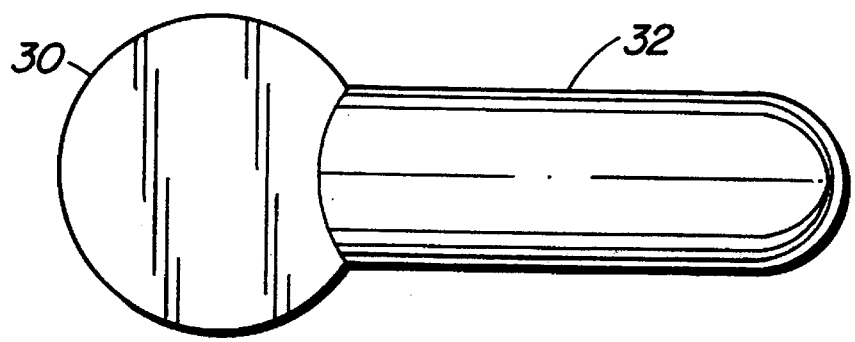

The upper end of the water heater 26 is, provided with a flue gas outlet to which is connected a flue outlet cap 30 (see FIGS. 9 and 10) to the cylindrical side wall of which is connected a flue gas duct 32 which extends outwardly and thence downwardly alongside the cylindrical wall of the heat exchanger or water heater 26. The lower end of this flue gas duct 32 ultimately passes through a suitably sized hole in the floor 33 of the van with the lower end thereof being open so as to vent the flue gases to the atmosphere.

Figure 6:
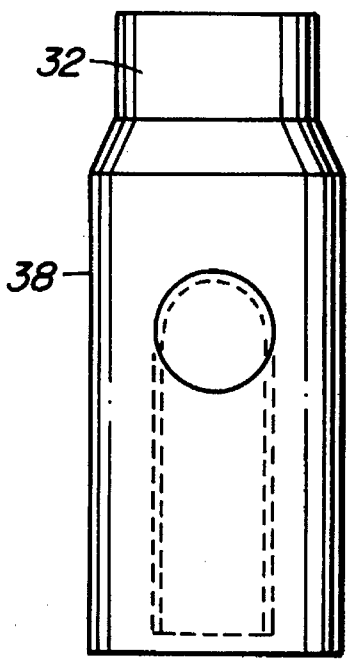
FIGS. 6, 7 and 8 are frontal, side and top views respectively of the Venturi portion of the system.

Since heated combustion gases naturally tend to rise upwardly, the present invention provides a means for positively drawing the spent combustion gases outwardly and thence downwardly and away from the top of the water heater 26. These means are illustrated in all of the drawings with details of the Venturi being particularly illustrated in FIGS. 6–8.

With further reference to the drawings, it will be seen that the exhaust silencer 24 is provided with an outlet exhaust conduit 36. In the embodiment shown this exhaust conduit 36 has a diameter of approximately two inches and its outlet end portion enters into a slightly enlarged portion 38 disposed at the lower end of the flue gas duct 32. For purposes of illustration, and not for reasons of limitation, in a typical embodiment the flue gas duct 32 may be in the order of 4 inches in diameter whereas its enlarged portion 38 is approximately 5 inches in diameter.

Figure 7:
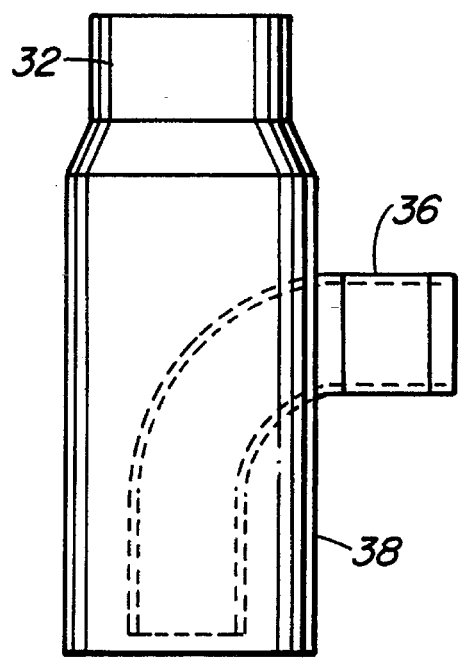
Figure 8:
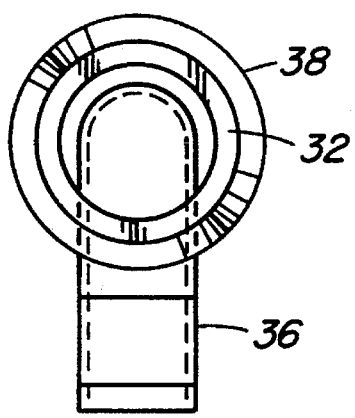

As best seen in FIG. 7, the terminal end portion of the exhaust conduit 36, after entering into the interior of enlarged portion 38, curves around through a 90° angle such that the terminal end portion of the exhaust conduit 36 comes into substantial axial alignment with the enlarged portion 38 of the flue gas duct and such that an annular space is defined between enlarged portion 38 and the terminal end portion of the exhaust conduit 36. As a result of this Venturi arrangement, during operation of the system, the exhausts from engine 18 and from blower 22, after combining together within the exhaust silencer 24, pass outwardly through the terminal end portion exhaust conduit 36 at a sufficient velocity as to reduce, by Venturi effect, the pressure within the enlarged portion 38 sufficiently to cause the combustion gases to be drawn downwardly through the flue gas duct 32 and S passed downwardly through the floor 33 of the van and thus safely vented to atmosphere.

This venting system ensures that harmful gases are drawn away from the burner of the water heater 26 and safely passed into the atmosphere outside of the van interior thus assuring safe operation of the equipment, while at the same time avoiding the need for unsightly flue gas stacks projecting through the top or side walls of the van as in various prior art systems. Installation of the system in a van is also facilitated as there is no need to design and install cumbersome flue gas ducts to carry spent gases through the roof or wall of the van as in the prior art.

The present invention may be embodied in other specific forms without departing from the spirit or essential attributes thereof and it is therefore desired that the present embodiments be considered in all respects as illustrative and not restrictive, reference being made to the appended claims rather than the foregoing description to indicate the scope of the invention.

I claim:

1. A van-mounted cleaning system including a van having a body, a water heater having a burner therein to heat the water and a flue outlet to release combustion gases therefrom, and a motor driven vacuum blower having an air input port and an output port for blower exhaust, both the water heater and the vacuum blower being mounted in an interior portion of the van body, a flue gas duct connected to said flue outlet and extending downwardly toward lower extremities of the van and then leading outwardly of the van body, and an exhaust conduit entering into said flue gas duct in such manner as to create a Venturi effect therewith tending to draw combustion gases away from said burner along said downwardly extending flue gas duct and thence outwardly of a lower portion of the van body.

2. The system of claim 1 wherein said flue gas duct includes an outlet portion extending through a floor portion of the van body.

3. The system of claim 2 wherein said exhaust conduit enters into said flue gas duct at a point adjacent said outlet portion to define a Venturi for providing said Venturi effect.

4. The system of claim 1 wherein said vacuum blower is driven by an internal combustion engine having an exhaust outlet communicating with the exhaust from said blower such that the combined engine exhaust and blower exhaust air are fed into said exhaust conduit.

5. The system of claim 4 including an exhaust silencer, and wherein said engine exhaust and said blower exhaust air pass into said exhaust silencer before moving through said exhaust conduit and into said flue gas duct.

6. The system of claim 5 wherein said burner is a fuel oil burner.

7. A van-mountable cleaning system for use in a van having a body and including a water heater having a burner therein to heat the water and a flue outlet to release combustion gases therefrom, and a motor driven vacuum blower having an air input port and an output port for blower exhaust, both the water-heater and the vacuum blower being mountable in an interior portion of a van body, a flue gas duct connected to said flue outlet and extending downwardly thereof such that when installed it is capable of leading outwardly of the van body, and an exhaust conduit entering into said flue gas duct in such manner as to create a Venturi effect therewith tending to draw combustion gases away from said burner along said downwardly extending flue gas duct and thence outwardly of a lower portion of the van body when installed therein.

8. The system of claim 7 wherein said flue gas duct includes an outlet portion capable of extending through a floor portion of the van body when installed therein.

9. The system of claim 8 wherein said exhaust conduit enters into said flue gas duct at a point adjacent said outlet portion to define a Venturi for providing said Venturi effect.

10. The system of claims 7 wherein said vacuum blower is driven by an internal combustion engine having an exhaust outlet communicating with the exhaust from said blower such that the combined engine exhaust and blower exhaust air are fed into said exhaust conduit.

11. The system of claim 10 including an exhaust silencer, and wherein said engine exhaust and said blower exhaust air pass into said exhaust silencer before moving through said exhaust conduit and into said flue gas duct.

* * * * *